United States Patent [19]
Ojaniemi

[11] Patent Number: 5,727,034
[45] Date of Patent: Mar. 10, 1998

[54] APPARATUS AND METHOD FOR SYNCHRONIZING BASE SITES INDIVIDUALLY IN A COMMUNICATION SYSTEM

[75] Inventor: Heikki Ojaniemi, San Diego, Calif.

[73] Assignee: Nokia Telecommunications Oy, Espoo, Finland

[21] Appl. No.: 507,530

[22] Filed: Jul. 26, 1995

[51] Int. Cl.⁶ ...................................................... H04L 7/00
[52] U.S. Cl. .......................... 375/356; 375/376; 327/156; 327/144
[58] Field of Search ........................ 375/356, 373, 375/376, 371; 327/144, 146, 147, 152, 156, 2, 3, 5, 403, 407

[56] References Cited

U.S. PATENT DOCUMENTS

| | | | |
|---|---|---|---|
| 5,245,634 | 9/1993 | Averbuch | 375/356 |
| 5,515,403 | 5/1996 | Sloan et al. | 375/371 |
| 5,577,080 | 11/1996 | Sakaue et al. | 375/373 |

Primary Examiner—Temesghen Ghebretinsae
Attorney, Agent, or Firm—Cushman Darby & Cushman Pillsbury Madison & Sutro LLP

[57] ABSTRACT

A communication system utilizes an external signal of high accuracy to maintain a good degree of accuracy of synchronization of base sites. A good example of such a signal is the signal transmitted by the global positioning system (GPS) or, a high accuracy PCM (pulse code modulation) or other high accuracy signal provided by a terrestrial transmission network including the base sites. When the synchronization to the GPS signal on one or more base sites cannot be achieved, the communication system employs an alternate synchronization source on those base sites that are missing the synchronization to the GPS signal. The alternate synchronization source is a separate local oscillator of the base site. To achieve the degree of synchronization accuracy provided by the GPS signal, the communication system learns the behavior of each and every local oscillator. This characterization is performed on each base site, and is done by utilizing the GPS signal when the GPS signal is present. When the synchronization to the GPS signal is lost, the characterized local oscillator is then employed such that synchronization of the base sites is transparent to the base sites. Use of the GPS signal to characterize the local oscillators allows the characterized oscillator to provide the same degree of accuracy as that of the GPS signal. The method of characterizing the alternate synchronization source on a site basis makes it possible to take the local oscillators' individual characteristics, as well as the site specific conditions, into account.

12 Claims, 2 Drawing Sheets

APPARATUS AND METHOD FOR SYNCHRONIZING BASE SITES INDIVIDUALLY IN A COMMUNICATION SYSTEM

TECHNICAL FIELD

The invention relates generally to synchronization in a communication systems, and more specifically to synchronization of base sites within communication systems including at least one central site and a plurality of base sites.

BACKGROUND OF THE INVENTION

In some communication systems, specifically in cellular radiotelephone systems, absolute timing between the base site and a subscriber unit is essential for effective operation of the system. Particularly in a code division multiple access (CDMA) digital cellular radio system, this is mandatory, because in the system a functional base site has to be synchronized within +/−3 μs of the GlobalPositioning System (GPS) time. As a result of this, the base sites are synchronized to each other with a great accuracy. The accuracy requirement is essential to achieve, because deviations in timing and synchronization will deteriorate the performance of a CDMA radio system which is experienced as poor service by the subscribers utilizing the system. The requirement is vital, not only regarding communication between a single base site and a personal station, but especially when two or more base-sites are communicating with one personal station. This is very true, since CDMA personal stations are capable of diversity, receiving transmissions from at least two base sites, and are able to make reception decisions upon either one, or both, of the transmissions. It is evident that, to achieve this purpose, the two base sites transmitting a signal are synchronized absolutely in time so that the subscriber unit may receive both transmissions at the same time and perform reception as required.

A typical solution for achieving the defined synchronization to the GPS system time is to arrange a GPS receiver on every base site and utilize the signal outputs from the GPS receiver to synchronize the base site timing. However, several failures can occur in the GPS system. For instance, GPS may go out of service either by compulsion or because of service, the GPS receiver on a base site may become faulty, the GPS receiver on a base site may be having service, or there may be an antenna or a cable failure on a base site. Moreover, there may be countries that are not able or not allowed to receive the GPS signal. Therefore some backup method for such situations is necessary.

Different methods have been evolved as techniques to backup the synchronization in cases, where GPS synchronization is not possible.

Firstly, high-accuracy clocks or oscillators (a Rubidium clock, for instance) can be installed on base sites. This method increases the complexity of the base sites in the form of increased number of units. It also adds substantially the cost of a base site, which, together the fact that the method reaches a limited accuracy only and, following, a limited back-up time, means that the method is not efficient.

Secondly, a central high-accuracy oscillator can be utilized. In that case, means for carrying the synchronization and timing information from a central site—or from number of central sites—to remote sites have to be developed. Such means can be difficult and costly to build, and certainly increase greatly the system complexity and the effort required for maintaining the system.

Thirdly, it is possible to use external signals received on base sites as reference signals or as signals to which to synchronize the base sites. Such external signals can be signals received from the terrestrial transmission networks or alternate signals received from the air (alternate to the GPS signal). These signals, however are not accurate nor stable enough, and cannot be used as such. If systems are built to characterize the signals on a site basis, these systems always add to the complexity and cost of the system. And there is always at least the extra cost that comes from adding additional units (receivers) in the base sites.

Lastly, different scattered network elements like base sites can send bit patterns over the terrestrial transmission network towards a central site (MSC, Mobile Switching Center, for instance). The central site can also send bit patterns towards the scattered network elements. At the receiving end, the bit pattern is looped back. By comparing the sent and received bit patterns and the delays between times of sending and receiving them, the network elements are capable of adjusting their timing, and staying in synchronization.

OBJECTS AND SUMMARY OF THE INVENTION

Accordingly, it is an object of the present invention to provide a reliable synchronization redundancy for an extended period of time, at the same time maintaining the system design and operation as simple as possible and as cost-effective as possible.

Briefly described, the present invention encompasses a timing unit and a method for characterizing—learning—the behavior of a local oscillator on every base site individually. The characterization takes place separately on each base site. The communication system has, coupled to the means of learning the behavior of every oscillator locally, a means—on every base site—for storing the information collected during the time of characterization, and a means for using this stored information on a base site to control the local oscillator, when the local oscillator is used as the synchronization source on that base site. Hence, the invention provides a redundancy synchronization method for using of a local oscillator on each base site in a controlled way, the information used for controlling the local oscillator being the information collected earlier of the behavior of this oscillator.

DETAILED DESCRIPTION OF THE PREFERRED EMBODIMENT

Figure 1:
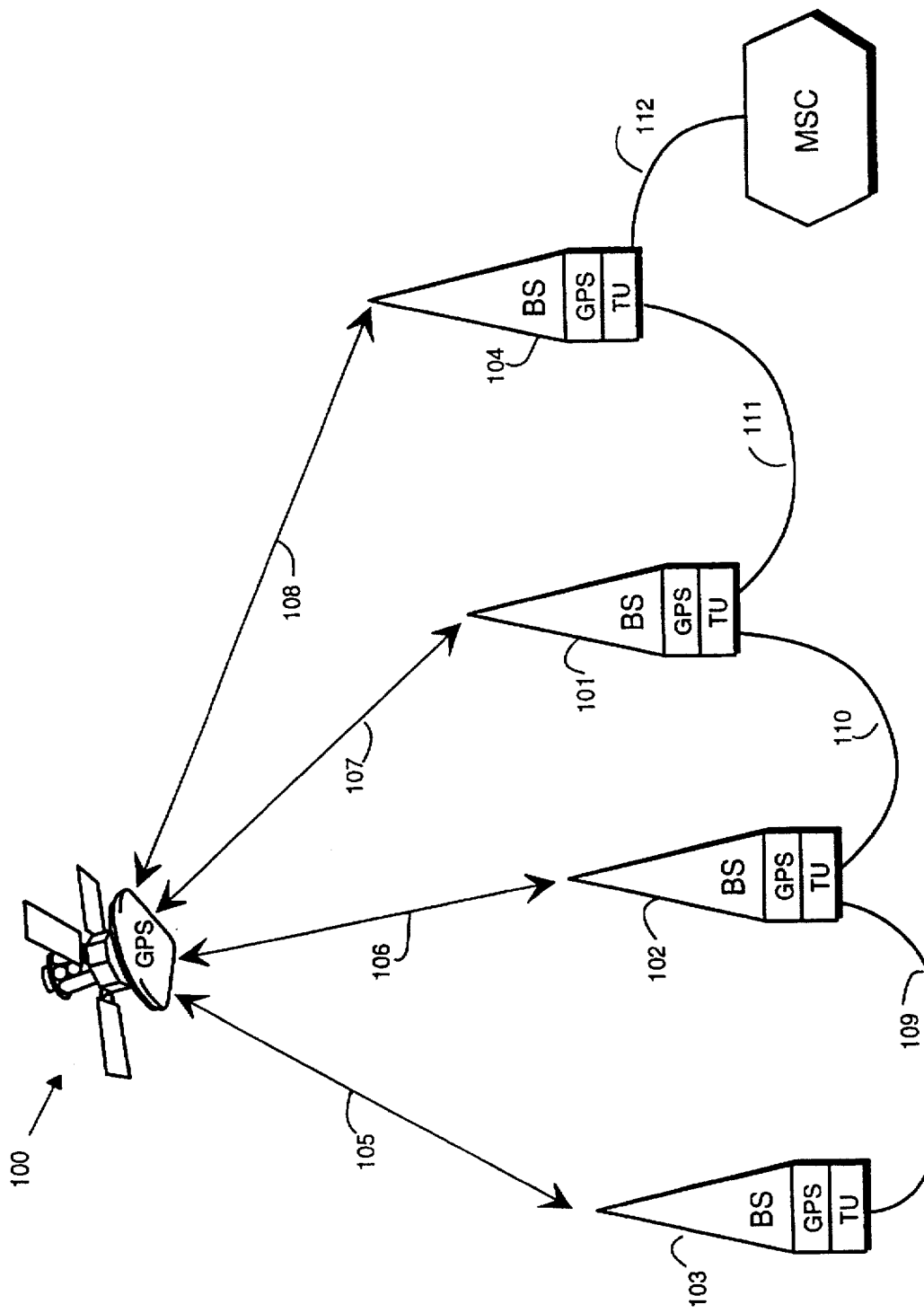
FIG. 1 generally depicts a Perolalt communication system, like a CDMA digital radiotelephone system.

FIG. 1 generally depicts a prior art communication system including a plurality of base sites 101, 102, 103, 104 and a central site which can be a mobile switching center MSC. Communication between mobile stations (not shown) and base sites takes place through air. The communication system can be any cellular radiotelephone system, i.e. analog, digital, frequency division multiple access (FDMA), time division multiple access (TDMA), Code Division Multiple Access (CDMA). In the preferred embodiment, the communication system is a CDMA digital cellular radiotelephone system which is synchronized to the GPS system time. Hence, each base station is receiving a synchronization signal from a GPS-satellite 100. The invention resides at the cellular base sites 101-104, which are capable of receiving primary synchronization signals 105-108 from the primary synchronization source 100.

Figure 2:
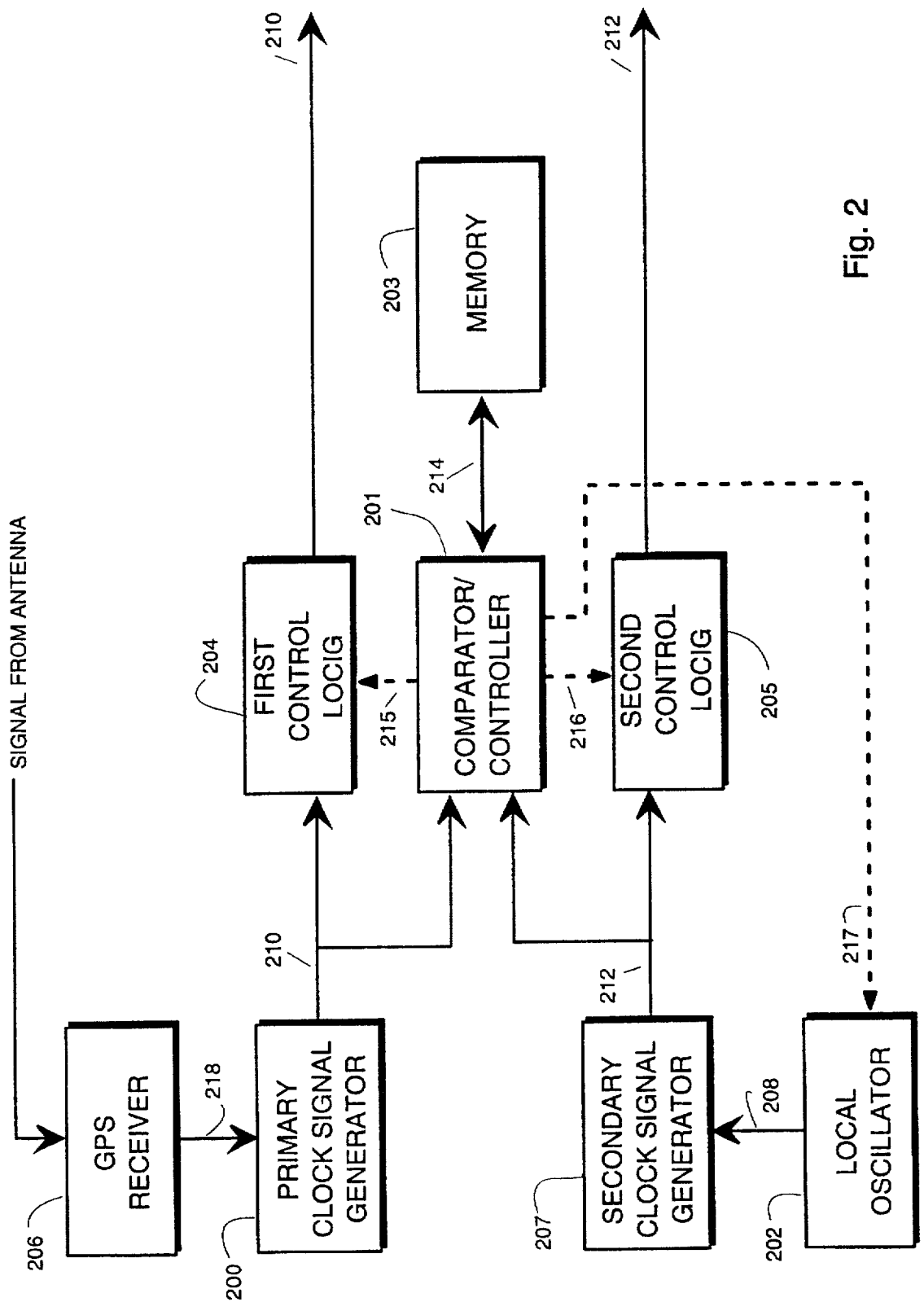
FIG. 2 generally depicts a block diagram of a timing unit provided in a base site in accordance with the principles of the present invention.

FIG. 2 depicts a timing unit according the present invention. The timing unit resides in each of the base sites 101-104. The unit includes two clock signal generators: a primary clock signal generator 200 and a secondary clock signal generator 207. The primary synchronization source of the primary clock signal generator 200 and thus of the whole timing unit is the GPS receiver 206 receiving the external high accuracy synchronization signal 105-108 from the GPS-satellite. From the GPS receiver 206, the high accuracy synchronization signal 218 is applied as a first reference signal to a primary clock signal generator 200, which generates a primary clock and synchronization signal 210. Hence, the primary clock signal generator 200 uses the high accuracy GPS synchronization signal 218 to produce all the clock and synchronization signals required for the operation of the site. The secondary synchronization source of the secondary clock generator 207 is a local oscillator 202 generating a a secondary synchronization signal 208, which is applied as a second reference signal to the secondary clock generator 207. The secondary clock generator produces a secondary clock and synchronization signal 212.

Further, the timing unit includes a comparator/controller 201 connected to the outputs of the clock signal generators 200 and 207. The comparator/controller compares the primary clock signal 210 and the secondary clock signal 212, makes a decision based both on the primary and secondary clock signals and information stored in a memory 203, and outputs a first control signal 215 for a first control logic and a second control signal 216 for a second control logic 205. Controlling the first control logic 204 by the first control signal 215 and the second control logic 205 by the second control signal 216, the comparator/controller 201 selects if the primary clock and synchronization signals 210 from the primary clock signal generator 200, or the secondary clock and synchronization signals 212 from the secondary clock signal generator 212 are used at the base site.

At the initial phase in the life-time of every base site, the timing unit and the GPS receiver 206 on every base site are initialized in the way that the primary clock and synchronization signals 210 from the primary clock signal generator 200 are transmitted correctly, to enable the correct operation of each base site. At the very same time, the local oscillator 202 on every base site is initialized also. The local oscillator transmits the secondary synchronization signal 208 to the secondary clock signal generator 207, which starts producing the clock and synchronization signals 212. The primary clock and synchronization signals 210 from the primary clock signal generator 210 and the corresponding signals 212 from the secondary clock signal generator 207 are received by the comparator/controller 201.

The comparator/controller compares the received signals 210 and 212. When differences in the signals are found, the comparator/controller 201 gives an adjustment signal, 217 to the local oscillator 202. As a response to the adjustment signal the local oscillator 202 adjusts the secondary synchronization signal 208, which then will result as alteration in the secondary clock and synchronization signals 212 from the secondary clock signal generator 200. The comparator/controller 201 gives the adjustment signals 217 as long as it takes to make the secondary clock and synchronization signals 212 identical with the primary clock and synchronization signals 210. All this time that it takes to adjust the clock and synchronization signals 212, the comparator/controller 201 uses the first and second control signals 215, 216 and control logic 204, 205 to secure, that only the primary clock and synchronization signals 210 are distributed further on the base site, but the secondary clock and synchronization signals 212 from the secondary clock signal generator 202 are not.

The primary clock signal generator 200 and the secondary clock signal generator 207 may be physically implemented as one unit. In these logical presentations they are, for the sake of clarity, shown as separate units.

As time goes by, the behavior of the local oscillator 202 may change. This may be due to aging of the oscillator and changes in the conditions of a base site, like changes in temperature, humidity etc. As a result of various changes and aging, the secondary synchronization signal 208 will vary accordingly, and also the secondary clock and synchronization signals 212 will deviate. This, however, will be noticed by the comparator/controller 201, which is comparing the primary 210 and secondary 212 clock and synchronization signals all the time. As a result: each time there is a need, the comparator/controller 201 gives the adjustment signal 217 to get the secondary clock and synchronization signals 212 to match the primary synchronization signals 210.

The comparator/controller 201 not only compares the clock and synchronization signals 210 and 212 and adjusts, with the adjustment signal 217, the local oscillator 202 accordingly, but it also memorizes all the relevant information about the adjustments 217 given to the local oscillator 202. All the information stored can contain environmental information ( temperature, humidity, etc.), the secondary synchronization signal 208 values and the second clock and synchronization signal 212 values before and after giving the adjustment signal 217, the adjustment signal value and the time of giving the adjustment signal. The information is stored into a memory area 203 reserved for this purpose. This way, the comparator/controller 201 has always in memory the latest information of the behavior of the local oscillator of environmental changes and of what has been done to keep the secondary synchronization signal 208 correct. Based on the stored information from the past, the controller 201 is able to estimate the behavior of the local oscillator in the future if one or more of aforementioned parameters will change.

Whenever there comes a failure in the primary clock and synchronization signals 210, the comparator/controller 201 recognizes the situation, and uses the first and second control signals 215, 216 and the first and second control logics 204, 205 to activate the distribution of secondary clock and synchronization signals 212 and to deactivate the distribution of primary clock and synchronization signals 210. It is worth noting that the secondary clock and synchronization signals 212 have been available all the time and therefore the switch-over to use them happens transparently to the rest of the base site.

As the secondary clock and synchronization signals 212 are distributed to the base site, the information in the memory 203, collected earlier about the behavior and the nature of the local oscillator is now read via the line 214 by the comparator/controller 201 from the memory and used for forming an adjusting signal 217 to the local oscillator.

This method of memorizing the behavior of each local oscillator individually makes it possible to tune the secondary synchronization signal individually, accurately on each base site, and justifies the method as a good long-term backup solution.

The secondary synchronization signal 208 from the local oscillator 202 is used as long as necessary. After the primary clock and synchronization signals 210 are available again, the comparator/controller 201 uses the control signals 215 and 216 and control logics 204 and 205 to activate the distribution of primary clock and synchronization signals and to deactivate the distribution of secondary clock and synchronization signals. From here on, the operation continues as normal; the primary clock and synchronization signals 210 are used, the comparator/controller 201 compares the primary and secondary clock and synchronization signals and gives adjustment signals 217 to the local oscillator, memorizing the necessary information about the adjustments and environment.

It is possible, and an option, to use more than one local oscillator per base site, combined with the similar characterization logic, to add more redundancy to the system.

The proposed method and apparatus have many advantages in comparison with the prior art timing systems. No external arrangements are needed for the synchronization, there is no need to receive other signals than the GPS signal, which is received anyway in a CDMA system. There is also no need to arrange extra transmitters, receivers or antennas, or signaling protocols over the terrestrial transmission network. The method is very cost-effective; the price of the hardware required for implementing it, and the design work for the Comparator software will certainly be lower that the price of extra receivers or transmitter on every site. From an operator's point of view, this is much easier and cheaper to manage than methods utilizing terrestrial transmission networks. Cheap oscillators can be used, instead of, e.g., expensive Rubidium Clocks.

Further, every base site, i.e. every Local Oscillator, can be treated as an individual. Thus, great accuracy can be received even with the secondary synchronization signal. The limit for the accuracy is only the logic used for learning and memorizing the behavior of the Local Oscillator, and the size of the memory used for storing the local oscillator adjustment data. The method gives redundancy, not only for cases, where the GPS signal is not globally available, but also for cases, where there is a failure in one or more sites GPS receiver antenna, or in the cabling from the antenna, or there is a failure in the GPS receiver itself, or in the primary clock signal generator. The method is totally independent of the terrestrial transmission method used. It is available very soon after the base site installation. After the base site has been installed, powered on and partly initialized, the primary clock and synchronization signals can be delivered already, and comparator/controller can start memorizing the adjustment data. Thus, the method works even on a stand-alone base site. This is a good point from the point of view, when new base sites are taken into use, and they are installed and commissioned well before connecting to the terrestrial transmission network and to the rest of the infrastructure.

While the present invention has been particularly shown and described with reference to the preferred embodiments thereof, it will be understood by those skilled in the art that various changes in form and details may be made therein without departing from the spirit and scope of the invention.

What is claimed is:

1. A method for generating a timing signal of a base site in a communication system including a plurality of base sites, each base site receiving an external high accuracy signal for using as a first reference signal for a primary clock signal generator, the method comprising the steps of:

comparing a primary clock signal from the primary clock signal generator with a secondary clock signal from a secondary clock signal generator;

producing an adjustment signal which is proportional to a difference between said clock signals;

adjusting, as a response to said adjustment signal, the phase and frequency of the secondary clock signal so that the secondary clock signal locks to the primary clock signal;

storing an adjustment signal information in a memory;

in the presence of the external high accuracy signal, selecting the primary clock signal as the timing signal; and in the absence of the external high accuracy signal, selecting the secondary clock signal as the timing signal and generating new adjustment signals based on the adjustment signal information stored in the memory.

2. A method according to claim 1, wherein a second reference signal for the secondary clock signal generator is generated by a local oscillator.

3. A method according to claim 2, wherein the adjusting step includes the step of applying the adjustment signal to the local oscillator for adjusting its phase and frequency.

4. A method according to claim 1, wherein information on environment including at least one of temperature and humidity at said base site is also included in said adjustment signal information.

5. A method according to claim 2, wherein the adjustment signal information is comprised of characteristics of the local oscillator, said information being formed while the external high accuracy signal is present.

6. A method according to claim 5, wherein the characteristics of the local oscillator are based on the local oscillator's responses to the adjustment signals.

7. A method according to claim 1, wherein said producing step includes a step for producing a first control signal and a second control signal as a response to the failure of the external high accuracy signal.

8. A method according to claim 7, wherein in said selecting step the secondary clock signal is selected as the timing signal as a response to said second control signal, and the primary clock signal is deselected as the timing signal as a response to said first control signal.

9. A timing unit for generating a timing signal of a base site in a communication system, the base site being capable of providing a primary synchronization signal which is locked to an external high accuracy signal, said timing unit comprising:

a comparator for comparing the primary synchronization signal with a secondary synchronization signal and for providing an adjustment signal which is proportional to a difference between said synchronization signals;

a secondary clock signal generating means connected to the comparator for providing the secondary synchronization signal, the phase and frequency of said signal being adjustable with said adjustment signal;

a controller for selecting the primary synchronization signal as the timing signal when the external high accuracy signal is present, and for selecting the secondary synchronization signal as the timing signal when the external high accuracy signal is lacking;

said controller also learning characteristics of the secondary clock generator means and storing said characteristics as an adjustment signal information in a memory and, in failure of the external high accuracy signal, generating new adjustment signals based on the adjustment signal information previously stored in the memory.

10. A timing unit according to claim 9, wherein the secondary clock signal generating means includes a local oscillator connected to a secondary clock signal generator, the phase and frequency of said local oscillator signal being adjustable with the adjustment signal.

11. A timing unit according to claim 10, wherein the controller collects data of the local oscillator's responses to different parameters including the adjustment signals and environment factors and based on said data calculates the characteristics of the local oscillator.

12. A timing unit according to claim 9, said unit further comprising:

a first logic for connecting the primary synchronization signal to the output of the timing unit as a response to a first control signal from the controller;

a second logic for connecting the secondary synchronization signal to the output of the timing unit as a response to a second control signal from the controller.

* * * * *